United States Patent
Sun et al.

(10) Patent No.: US 12,175,359 B2
(45) Date of Patent: Dec. 24, 2024

(54) MACHINE LEARNING HARDWARE HAVING REDUCED PRECISION PARAMETER COMPONENTS FOR EFFICIENT PARAMETER UPDATE

(71) Applicant: International Business Machines Corporation, Armonk, NY (US)

(72) Inventors: Xiao Sun, Pleasantville, NY (US); Jungwook Choi, Seoul (KR); Naigang Wang, Ossining, NY (US); Chia-Yu Chen, White Plains, NY (US); Kailash Gopalakrishnan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1250 days.

(21) Appl. No.: 16/558,585

(22) Filed: Sep. 3, 2019

(65) Prior Publication Data

US 2021/0064985 A1    Mar. 4, 2021

(51) Int. Cl.
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC .............. G06N 3/08; G06N 3/04; G06N 3/06
See application file for complete search history.

(56) References Cited

U.S. PATENT DOCUMENTS

| | | | |
|---|---|---|---|
| 8,161,268 | B2 | 4/2012 | Faraj |
| 9,912,349 | B1 | 3/2018 | Ouyang et al. |
| 10,019,232 | B2 | 7/2018 | Nystad |
| 10,223,635 | B2 | 3/2019 | Annapureddy et al. |

(Continued)

FOREIGN PATENT DOCUMENTS

| | | |
|---|---|---|
| CN | 106127217 A | 1/2018 |
| CN | 107644254 A | 1/2018 |

(Continued)

OTHER PUBLICATIONS

Raghuraman Krishnamoorthi, "Quantizing Deep Convolutional Networks for Efficient Inference: A Whitepaper," arXiv preprint arXiv:1806.08342V1, Jun. 21, 2018, 36 pages.

(Continued)

*Primary Examiner* — Kamran Afshar
*Assistant Examiner* — Brian J Hales
(74) *Attorney, Agent, or Firm* — Daniel Yeates; Ryan, Mason & Lewis, LLP

(57) ABSTRACT

An apparatus for training and inferencing a neural network includes circuitry that is configured to generate a first weight having a first format including a first number of bits based at least in part on a second weight having a second format including a second number of bits and a residual having a third format including a third number of bits. The second number of bits and the third number of bits are each less than the first number of bits. The circuitry is further configured to update the second weight based at least in part on the first weight and to update the residual based at least in part on the (Continued)

updated second weight and the first weight. The circuitry is further configured to update the first weight based at least in part on the updated second weight and the updated residual.

20 Claims, 7 Drawing Sheets

(56) References Cited

U.S. PATENT DOCUMENTS

| | | | |
|---|---|---|---|
| 2015/0324690 A1* | 11/2015 | Chilimbi | G06N 3/08 706/27 |
| 2015/0356461 A1 | 12/2015 | Vinyals et al. | |
| 2016/0162781 A1 | 6/2016 | Lillicrap et al. | |
| 2016/0232445 A1* | 8/2016 | Srinivasan | G06N 3/08 |
| 2016/0328643 A1 | 11/2016 | Liu et al. | |
| 2017/0286830 A1 | 10/2017 | El-Yaniv et al. | |
| 2018/0211152 A1 | 7/2018 | Migacz et al. | |
| 2018/0307494 A1 | 10/2018 | Ould-Ahmed-Vall et al. | |
| 2018/0307971 A1 | 10/2018 | Sinha et al. | |
| 2018/0308201 A1 | 10/2018 | Appu et al. | |
| 2018/0314940 A1* | 11/2018 | Kundu | G06N 3/045 |
| 2018/0322382 A1 | 11/2018 | Mellempudi et al. | |
| 2018/0322607 A1 | 11/2018 | Mellempudi et al. | |
| 2019/0012559 A1 | 1/2019 | Desappan et al. | |
| 2019/0042544 A1 | 2/2019 | Kashyap et al. | |
| 2019/0042945 A1 | 2/2019 | Majumdar et al. | |
| 2019/0102671 A1 | 4/2019 | Cohen et al. | |
| 2019/0122100 A1 | 4/2019 | Kang et al. | |
| 2020/0012936 A1 | 1/2020 | Lee et al. | |

FOREIGN PATENT DOCUMENTS

| | | |
|---|---|---|
| CN | 108805286 A | 11/2018 |
| JP | 2020009444 A | 1/2020 |
| WO | 2015011688 A2 | 1/2015 |
| WO | 2019009897 A1 | 1/2019 |
| WO | PCT/IB2020/057723 | 11/2020 |

OTHER PUBLICATIONS

S.R. Jain et al., "Trained Uniform Quantization for Accurate and Efficient Neural Network Inference on Fixed-Point Hardware," arXiv preprint arXiv:1903.08066V1, Mar. 19, 2019, 17 pages.

H. Park et al., "Training Deep Neural Network in Limited Precision," arXiv preprint arXiv:1810.05486V1, Oct. 12, 2018, 11 pages.

S.Yin et al., "Minimizing Area and Energy of Deep Learning Hardware Design Using Collective Low Precision and Structured Compression," 51st Asilomar Conference on Signals, Systems, and Computers, Oct. 1, 2017, pp. 1907-1911.

Andrew Gibiansky, "Bringing HPC Techniques to Deep Learning," Machine Learning, Feb. 21, 2017, 11 pages.

Ruder.io, "An Overview of Gradient Descent Optimization Algorithms," www.ruder.io/optimizing-gradient-descent/, Jan. 19, 2016, 24 pages.

N. Wang et al., "Training Deep Neural Networks with 8-bit Floating Point Numbers," Proceedings of the 32nd International Conference on Neural Information Processing Systems (NIPS), Dec. 3-8, 2018, 10 pages.

P.C. Lin et al., "FloatSD: A New Weight Representation and Associated Update Method for Efficient Convolutional Neural Network Training," IEEE Journal on Emerging and Selected Topics in Circuits and Systems, Apr. 18, 2019, pp. 267-279, vol. 9, No. 2.

C. Case et al., "NVIDIA Apex: Tools for Easy Mixed-Precision Training in PyTorch," https://devblogs.nvidia.com/apex-pytorch-easy-mixed-precision-training/, Dec. 3, 2018, 9 pages.

S.K. Esser et al., "Learned Step Size Quantization," arXiv preprint arXiv:1902.08153v1, Feb. 21, 2019, 9 pages.

United Kingdom IPO Examination Report under Section 18(3) for Application No. GB2201893.1, Mar. 14, 2023, 5 pages.

Office Action for counterpart Japanese Application No. 2022-503833 dated Jan. 5, 2024, with English translation, 2 pages.

* cited by examiner

100

200

MACHINE LEARNING HARDWARE HAVING REDUCED PRECISION PARAMETER COMPONENTS FOR EFFICIENT PARAMETER UPDATE

BACKGROUND

A floating point representation of a given number comprises three main parts, a significand that contains the number's digits, an exponent that sets the location where the decimal (or binary) point is placed relative to the beginning of the significand, where negative exponents represent numbers that are very small (i.e., close to zero), and a sign (positive or negative) associated with the number.

A floating point unit (FPU) is a processor or part of a processor implemented as a hardware circuit that performs FP calculations. While early FPUs were standalone processors, most are now integrated inside a computer's CPU. Integrated FPUs in modern CPUs are very complex since they perform high-precision floating point computations while ensuring compliance with the rules governing these computations, for example, as set forth in the Institute of Electrical and Electronics Engineers (IEEE) floating point standards.

The configuration and training of a machine learning model such as, e.g., deep learning neural networks, also referred to as Deep Neural Networks (DNN), is often computationally intensive. Each iteration, or cycle, of the training of a DNN may require many floating point computations. For example, where a DNN includes a large number of nodes, the number of floating point computations that are required to train the DNN scales exponentially with the number of nodes. In addition, the different floating point computations that are used in the DNN training may have different precision requirements.

Machine learning workloads also tend to be computationally demanding. For example, the training algorithms for popular deep learning benchmarks often take weeks to converge when using systems that comprise multiple processors. Specialized accelerators that can provide large throughput density for floating point computations, both in terms of area (computation throughput per square millimeter of processor space) and power (computation throughput per watt of electrical power consumed), are critical metrics for future deep learning systems.

SUMMARY

Embodiments of the invention provide techniques for training and inferencing a neural network using hardware circuitry.

In one embodiment, an apparatus includes circuitry for a neural network. The circuitry is configured to generate a first weight having a first format including a first number of bits based at least in part on a second weight having a second format including a second number of bits and a residual having a third format including a third number of bits. The second number of bits and the third number of bits are each less than the first number of bits. The circuitry is further configured to update the second weight based at least in part on the first weight and to update the residual based at least in part on the updated second weight and the first weight. The circuitry is further configured to update the first weight based at least in part on the updated second weight and the updated residual.

In another embodiment, a method includes generating a first weight having a first format including a first number of bits based at least in part on a second weight having a second format including a second number of bits and a residual having a third format including a third number of bits. The second number of bits and the third number of bits are each less than the first number of bits. The method further includes updating the second weight based at least in part on the first weight, updating the residual based at least in part on the updated second weight and the first weight and updating the first weight based at least in part on the updated second weight and the updated residual. The method is performed at least in part by circuitry for a neural network.

In yet another embodiment, an apparatus includes at least one learner of a multiple learner system including a plurality of components. The at least one learner is configured to generate a portion of a gradient and to provide the portion of the gradient to at least one other component of the multiple learner system. The at least one learner is further configured to obtain at least a portion of a weight from the at least one other component of the multiple learner system and to update the portion of the gradient based at least in part on the obtained at least a portion of the weight.

These and other objects, features and advantages of the present invention will become apparent from the following detailed description of illustrative embodiments thereof, which is to be read in connection with the accompanying drawings.

DETAILED DESCRIPTION

Illustrative embodiments of the invention may be described herein in the context of illustrative methods, systems and devices for training a machine learning model, e.g., a DNN. However, it is to be understood that embodiments of the invention are not limited to the illustrative methods, systems and devices but instead are more broadly applicable to other suitable methods, systems and devices.

An FPU typically has a fixed bit-width size in terms of the number of binary bits that may be used to represent a number in a floating point format (referred to hereinafter as a "format" or "floating point format"). Some example FPU bit-width size formats comprise 8-bit (FP8), 16-bit (FP16), 32-bit (FP32), 64-bit (FP64) and 128-bit (FP128) formats.

Typically, the larger the bit-width size format of an FPU, the more complex and larger the FPU is in terms of physical size of the semiconductor fabricated circuit. In addition, as the FPU increases in size and complexity, the electrical power that is consumed and the amount of time that it takes to produce an output for a floating point computation is also increased.

The use of a large bit-width size format such as, e.g., FP64, also results in increased latency on the FPU for reads and updates as well as additional memory and bandwidth requirements both on and off the FPU. Many of these issues may be mitigated through the use of a smaller bit-width format such as, e.g., FP32, for both storage and use during training and inferencing at the cost of a reduction in precision.

In illustrative embodiments, the above issues may be further mitigated by breaking high precision floating point parameters into two separate components, low-precision quantized weights and round-off residuals. A scaling technique is also disclosed that inhibits the occurrence of a residual overflow, and learner circuitry is disclosed that implements a process for quantization, round-off residual calculation and weight updates using the low-precision quantized weights and the round-off residuals. Finally, a protocol for multiple learners is disclosed that utilizes the disclosed low-precision quantized weights, round-off residuals, processes and learner circuitry to minimize storage space and bandwidth usage during weight read and update operations.

A weight update flow according to an illustrative embodiment will now be described with reference FIG. 1 and equations (1) through (5) below.

Figure 1:
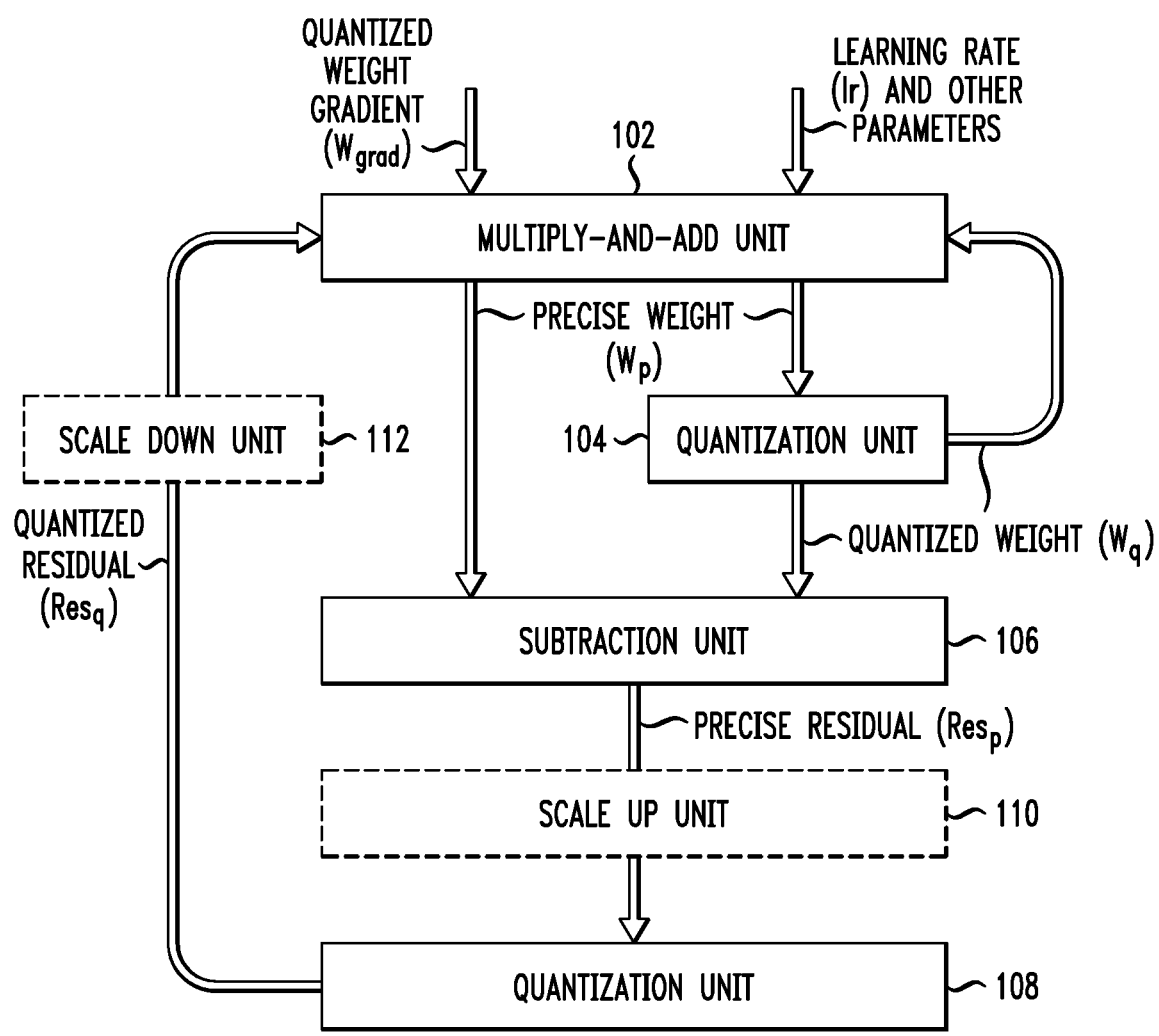
FIG. 1 depicts circuitry of an apparatus that is configured for performing a weight update flow of a neural network, according to an exemplary embodiment of the present invention.

With reference now to FIG. 1, learner circuitry 100 comprises a multiply-and-add unit 102, quantization unit 104, subtraction unit 106 and quantization unit 108. In some embodiments, learner circuitry 100 may also comprise a scale up unit 110 and a scale down unit 112. Scale up unit 110 and scale down unit 112 are illustrated in dashed lines to indicate that they are optional. While described as singular units 102 through 108, in some embodiments each unit 102 through 108 may comprise multiple units.

Multiply-and-add unit 102 is configured to receive quantized weight gradients ($W_{grad}$), learning rates (lr), quantized residuals ($Res_q$) from a prior iteration, quantized weights ($W_q$) from the prior iteration and other similar parameters as initial inputs and to generate precise weights $W_p$ as an output. For example, in some embodiments, the quantized weight gradients $W_{grad}$, quantized residuals $Res_q$, and quantized weights $W_q$ may each have an FP8 format while the precise weights $W_p$ may have an FP16, FP32, FP64 or other similar high-precision format.

With reference to equation (1), prior to a first iteration, the quantized residual $Res_q$ is initially set to a value of 0.

$$Res_q = 0 \qquad (01)$$

During each iteration of the weight update flow, a precise weight $W_p$ is calculated by multiply-and-add unit 102 according to equation (2) below:

$$W_p = W_q - lr \times W_{grad} + Res_q \qquad (2)$$

Where $W_p$ is the precise weight; $W_q$ is the quantized weight; lr is the learning rate; $W_{grad}$ is the quantized weight gradient; and $Res_q$ is the quantized residual.

For example, if $W_q$ has an initial value of 5.1015625 and $lr \times W_{grad}$ has a value of −0.03125 with lr of 2.0 and $W_{grad}$ of −0.015625, equation (2) becomes $W_p$=5.1015625−(−0.03125)+0. The multiply-and-add unit 102 calculates the precise weight $W_p$ as 5.1328125. In illustrative embodiments, the quantized inputs, e.g., $W_q$, $W_{grad}$ and $Res_q$ have a lower precision format such as, e.g., an FP8 format, while the precise output, e.g., $W_p$, has a higher precision format such as, e.g., FP16, FP32, or FP64. In an illustrative embodiment, the quantized inputs have the FP8 format and the precise output has the FP32 format. The precise weight $W_p$ is provided to both the quantization unit 104 and to the subtraction unit 106.

The quantization unit 104 updates the value of the quantized weight $W_q$ according to equation (3) below:

$$W_q = Q_W(W_p) \qquad (3)$$

Where $Q_W(\ )$ is a quantization function such as, e.g., truncation, nearest rounding, stochastic rounding, or other common quantization functions. For example, the precise weight $W_p$ may be quantized from the higher precision floating point format such as, e.g., FP32 in the illustrative embodiment, to a lower precision floating point format such as, e.g., FP8 in the illustrative embodiment. In the example above, equation (3) becomes $W_q = Q_W(5.1328125)$. Depending on the quantization function that is selected and the target format, in one example, the updated quantized weight $W_q$ may be calculated as 5.0. The quantized weight $W_q$ is provided to both subtraction unit 106 for use during the current iteration and also to multiply-and-add unit 102 for use during the next iteration.

The subtraction unit 106 updates the value of the precise residual $Res_p$ according to equation (4) below:

$$Res_p = W_p - W_q \qquad (4)$$

In equation (4), $W_p$ is the high-precision updated weight provided by the multiply-and-add unit 102 and $W_q$ is the low-precision quantized weight provided by the quantization unit 104. In the example above, $Res_p$=5.1328125−5.0. The subtraction unit 106 calculates the precise residual $Res_p$ as 0.1328125. In the illustrative embodiment, the subtraction unit 106 outputs the precise residual $Res_p$ in the FP32 format. In other embodiments, subtraction unit 106 may output the precise residual $Res_p$ in other floating point formats such as, e.g., FP64 or FP16. The precise residual $Res_p$ is provided to the quantization unit 108.

Quantization unit 108 updates the quantized residual $Res_q$ according to equation (5) below:

$$Res_q = Q_R(Res_p) \quad (5)$$

Where $Q_R(\ )$ is a quantization function such as, e.g., truncation, nearest rounding, stochastic rounding, or other common quantization functions. For example, quantization unit 108 may quantize the precise residual $Res_p$ from a higher precision floating point format such as, e.g., FP32, to a quantized residual $Res_q$ having a lower precision floating point format such as, e.g., FP16 or FP8. In the illustrative embodiment, quantization unit 108 quantizes the FP32 precise residual $Res_p$ to an FP16 quantized residual $Res_q$. In the example above, equation (5) becomes $Res_q = Q_R(0.1328125)$. Depending on the quantization function that is selected, in one example, quantization unit 108 calculates the quantized residual $Res_q$ as 0.140625. The quantized residual $Res_q$ is provided to the multiply-and-add unit 102 by the quantization unit 108 for use during the next iteration.

Continuing the example, at the start of a second iteration, the quantized weight $W_q$=5.0 (the updated $W_q$ value from the above iteration), $lr \times W_{grad}$=0.05078125 with lr of 2.0 and $W_{grad}$ of 0.025390625, and the quantized residual $Res_q$=0.140625. Multiply-and-add unit 102 calculates the precise weight $W_p$ according to equation (2) as $W_p$=5.0−0.05078125+0.140625=5.08984375 and provides the updated precise weight $W_p$ to quantization unit 104 and subtraction unit 106. Quantization unit 104 calculates the quantized weight $W_q$ according to equation (3) as $W_q$=Qw(5.08984375)=5.0 and provides the quantized weight $W_q$ to both the multiply-and-add unit 102 for use in the next iteration and subtraction unit 106 for use in the current iteration. Subtraction unit 106 calculates the precise residual $Res_p$ according to equation (4) as $Res_p$=5.08984375−5=0.08984375 and provides the precise residual $Res_p$ to the quantization unit 108. Quantization unit 108 calculates the quantized residual $Res_q$ according to equation (5) as $Res_q = Q_R(0.08984375) = 0.09375$ and provides the quantized residual $Res_q$ to the multiply-and-add unit 102 for use in the next iteration. The process then can repeat for each iteration using the updated values for the quantized weight $W_q$ and quantized residual $Res_q$ as inputs in the next iteration.

In some cases, if the residuals are quantized aggressively, e.g., to a low precision format such as an FP8 format with 4 or 5 exponent bits, the range may be too limited to represent small values. In an illustrative embodiment, the residual is scaled up by a ratio before quantization and scaled back down in the next iteration before use. For example, the scale may be chosen by the function $f(q_{min}/p_{min}, q_{max}/p_{max})$ where $p_{min}$ is the smallest number that may be quantized, $q_{min}$ is the smaller number the low precision format can represent, $p_{max}$ is the largest number that may be quantized, and $q_{max}$ is the largest number that the low precision format can represent. Function $f(\ )$ represents a balance between overflow and underflow. As an example, if function $f(\ )$ is a min( ) function, a scale factor is chosen that is small enough to avoid an overflow, e.g., $p_{max} \times scale < q_{max}$.

When scaling is utilized on the residuals, the scale up unit 110 and the scale down unit 112 are added to the learner circuitry 100, as shown in FIG. 1.

Scale up unit 110, when included, is disposed between the subtraction unit 106 and quantization unit 108 in the weight update flow and performs a scale up operation on the precise residual $Res_p$ output from the subtraction unit 106 to scale up the precise residual $Res_p$ according to equation (6), below.

$$Res_p = Res_p \times scale \quad (6)$$

The scaled up precise residual $Res_p$ is then used as the input for quantization unit 108 instead of the original $Res_p$ output from the subtraction unit 106. The quantization unit 108 generates a scaled up quantized residual $Res_q$ according to equations (5) which is output to the scale down unit 112.

Scale down unit 112, when included, is disposed between the quantization unit 108 and the multiply-and-add unit 102 in the weight update flow and performs a scale down operation on the scaled up quantized residual $Res_q$ output from the quantization unit 108 to scale down the quantized residual $Res_q$ according to equation (7), below.

$$Res_q = \frac{Res_q}{scale} \quad (7)$$

The quantized residual $Res_q$ output by the scale down unit 112 is provided by the scale down unit 112 to the multiply-and-add unit 102 and the next iteration continues as normal with multiply-and-add unit 102 calculating the precise weight $W_p$ according to equation (2) using the quantized $Res_q$ received from the scale down unit 112.

The benefit of performing scaling will be shown in the following two example scenarios.

In the first example scenario, no scaling is utilized, e.g., with a scale of 1. Multiply-and-add unit 102 obtains an input quantized weight $W_q$ of 0.5, an input $Res_q$ of 0.0 and an input $lr \times W_{grad}$ of 1.52587890625E−5. Multiply-and-add unit 102 uses equation (2) to calculate a precise weight $W_p$ of 0.5000152587890625. Quantization unit 104 uses equation (3) to calculate a quantized weight $W_q$ of 0.5. Subtraction unit 106 uses equation (4) to calculate a precise residual $Res_p$ of 1.52587890625E−5 and provides the calculated precise residual $Res_p$ to the scale up unit 110.

Scale up unit 110 uses equation (6) to calculate the scaled up precise residual $Res_p$ as $Res_p$=1.52587890625E−5×1=1.52587890625E−5, i.e., no change from the precise residual $Res_p$ calculated by subtraction unit 106 since no scaling is used. The scaled up precise residual $Res_p$ is provided to the quantization unit 108 which uses equation (5) to calculate a scaled up quantized residual $Res_q$ of 0.0. The scaled up quantized residual $Res_q$ is provided to the scale down unit 112 which uses equation (7) to scale down the quantized residual $Res_q$ as $Res_q$=0.0/1.0=0. The scaled down quantized residual $Res_q$ of 0.0 is provided to the multiply-and-add unit 102 as an input for the next iteration.

In the next iteration, multiply-and-add unit 102 obtains the quantized weight $W_q$ of 0.5 from the prior iteration, an input scaled down $Res_q$ of 0.0 and an input $lr \times W_{grad}$ of 4.57763671875E−5. Multiply-and-add unit 102 uses equation (2) to calculate a precise weight $W_p$ of 0.5000457763671875. Quantization unit 104 uses equation (3) to calculate a quantized weight $W_q$ of 0.5. Subtraction unit 106 uses equation (4) to calculate a precise residual $Res_p$ of 4.57763671875E−5 and provides the calculated precise residual $Res_p$ to the scale up unit 110.

Scale up unit 110 uses equation (6) to calculate the scaled up precise residual $Res_p$ as $Res_p$=4.57763671875E−5×1=4.57763671875E−5. The scaled up precise residual $Res_p$ of 4.57763671875E−5 is provided to the quantization unit 108 which uses equation (5) to calculate a scaled up quantized residual $Res_q$ of 0.0. The scaled up quantized residual $Res_q$ of 0.0 is provided to the scale down unit 112 which uses equation (7) to scale down the quantized residual $Res_q$ as $Res_q=0.0/1=0.0$. The scaled down quantized residual $Res_q$ of 0.0 is provided to the multiply-and-add unit 102 as an input for the next iteration.

As seen from the above example scenario, when no scaling is utilized for the residual and the precise residual $Res_p$ is very small, e.g., smaller than the minimum value that the floating point format from the quantization can handle, the quantized residual $Res_q$ becomes 0.0 and no residual information is carried over to the subsequent iterations.

In the second example scenario, scaling is utilized, e.g., with scale of $2^8=256$. Multiply-and-add unit 102 obtains an input quantized weight $W_q$ of 0.5, an input $Res_q$ of 0.0 and an input $lr \times W_{grad}$ of 1.52587890625E−5. Multiply-and-add unit 102 uses equation (2) to calculate a precise weight $W_p$ of 0.5000152587890625. Quantization unit 104 uses equation (3) to calculate a quantized weight $W_q$ of 0.5. Subtraction unit 106 uses equation (4) to calculate a precise residual $Res_p$ of 1.52587890625E−5 and provides the calculated precise residual $Res_p$ to the scale up unit 110.

Scale up unit 110 uses equation (6) to calculate the scaled up precise residual $Res_p$ as $Res_p$=1.52587890625E−5× 256=0.00390625. The scaled up precise residual $Res_p$ of 0.00390625 is provided to the quantization unit 108 which uses equation (5) to calculate a scaled up quantized residual $Res_q$ of 0.00390625. The scaled up quantized residual $Res_q$ of 0.00390625 is provided to the scale down unit 112 which uses equation (7) to scale down the quantized residual $Res_q$ as $Res_q$=0.00390625/256=1.52587890625E−5. The scaled down quantized residual $Res_q$ of 1.52587890625E−5 is provided to the multiply-and-add unit 102 as an input for the next iteration.

In the next iteration, multiply-and-add unit 102 obtains the quantized weight $W_q$ of 0.5 from the prior iteration, an input scaled down $Res_q$ of 1.52587890625E−5 and an input $lr \times W_{grad}$ of 4.57763671875E−5. Multiply-and-add unit 102 uses equation (2) to calculate a precise weight $W_p$ of 0.50006103515625. Quantization unit 104 uses equation (3) to calculate a quantized weight $W_q$ of 0.5. Subtraction unit 106 uses equation (4) to calculate a precise residual $Res_p$ of 6.103515625E−5 and provides the calculated precise residual $Res_p$ to the scale up unit 110.

Scale up unit 110 uses equation (6) to calculate the scaled up precise residual $Res_p$ as $Res_p$=6.103515625E−5× 256=0.015625. The scaled up precise residual $Res_p$ of 0.015625 is provided to the quantization unit 108 which uses equation (5) to calculate a scaled up quantized residual $Res_q$ of 0.015625. The scaled up quantized residual $Res_q$ of 0.015625 is provided to the scale down unit 112 which uses equation (7) to scale down the quantized residual $Res_q$ as $Res_q$=0.015625/256=6.103515625E−5. The scaled down quantized residual $Res_q$ of 6.103515625E−5 is provided to the multiply-and-add unit 102 as an input for the next iteration.

As seen from the second example scenario, when scaling is utilized for the residual and the precise residual $Res_p$ is very small, e.g., smaller than the minimum value that the floating point format from the quantization can handle, the quantized residual $Res_q$ that is carried over from the first iteration to the second iteration becomes 1.52587890625E−5 instead of 0.0 as was the case in example scenario 1. By scaling up the precise residual $Res_q$, which has a high-precision floating point format such as, e.g., FP32, before quantization to the quantized residual $Res_q$, which has a low-precision floating point format such as, e.g., FP8 or FP16, smaller residual values that would have otherwise been lost in the quantization process can be captured for use in the next iteration. For example, as seen in the second iteration, the residual values are carried through and further accumulated. Note that in some embodiments, the value of $lr \times W_{grad}$ is effectively captured and accumulated in the quantized residual $Res_q$.

In illustrative embodiments, the quantized outputs of the weights, residuals, momentum and other parameters which are stored for use in subsequent iterations may be optimized according to the following formats. Momentum is an optional parameter in an SGD optimizer to update the weight. Momentum is calculated based on the momentum of the previous iteration and the gradient of the current iteration. For example, the momentum for each iteration may be calculated according to equations (8)-(10) as follows:

$$v_p = \beta v_q + lr \times W_{grad} \qquad (8)$$

$$W_p = W_q - v_p + Res_q \qquad (9)$$

$$v_q = Q(v_p) \qquad (10)$$

Where:

$v_p$ is the precise momentum;

$v_q$ is the quantized momentum from the previous iteration;

$\beta$ is a constant that is less than 1, e.g., 0.9; and $Q(v_p)$ is a quantization function of $v_p$ such as, e.g., truncation, nearest rounding, stochastic rounding, or other common quantization functions. For example, a quantization unit such as those described above may quantize the precise momentum $v_p$ from a higher precision floating point format such as, e.g., FP32, to a quantized momentum $v_q$ having a lower precision floating point format such as, e.g., FP16 or FP8. The quantized momentum $v_q$ is utilized during the next iteration.

For the quantized weight $W_q$, in an example embodiment, an FP8 format may be utilized which comprises one sign bit, four exponent bits and three mantissa bits, i.e., a (1, 4, 3) configuration. The (1, 4, 3) configuration shows the good performance for various deep learning tasks and improves performance over higher precision formats such as FP16, FP32, etc. when utilized for the quantized weight $W_q$. In other embodiments, other FP8 formats may be utilized for the quantized weight $W_q$ including, for example a (1, 5, 2) format, a (1, 6, 1) formation, or any other FP8 format. In some embodiments, an FP16 or other higher precision format may alternatively be utilized for the quantized weight $W_q$.

For the quantized residual $Res_q$, in an example embodiment, an FP16 format may be utilized which comprises one sign bit, six exponent bits and nine mantissa bits, i.e., a (1, 6, 9) configuration. The (1, 6, 9) configuration allows the quantized residual $Res_q$ to store residual information which is not captured by the FP8 format quantized weight $W_q$. In other embodiments, other FP16 formats may be utilized for the quantized residual $Res_q$. In some embodiments, a lower precision format such as, e.g., an FP8 format may be utilized for the quantized residual $Res_q$. In some embodiments, an FP32 or other higher precision format may alternatively be utilized for the quantized residual $Res_q$.

In some embodiments, the quantization format for the momentum and other intermediate parameters may also utilize the same format as the quantized residual $Res_q$, e.g., the FP16 format in the (1, 6, 9) configuration or one of the other formats mentioned above. In other embodiments, the quantization format for the momentum or other intermediate parameters may utilize a different format than the quantized residual $Res_q$.

By breaking high precision parameters such as precise weights $W_p$, into quantized weights $W_q$ and quantized residuals $Res_q$ for use in subsequent iterations, learner circuitry 100 reduces the number of bits that need to be stored as compared to storing the full high precision parameters that are typically used in neural network operations. For example, where typically a high-precision FP32 format precise weight $W_p$ is stored in a precision of 32-bits for use in the next iteration, in illustrative embodiments, the precise weight $W_p$ is converted to two components, an 8-bit quantized weight $W_q$ and a 16-bit quantized residual $Res_q$ which only requires a storage of 24 bits.

Figure 2:
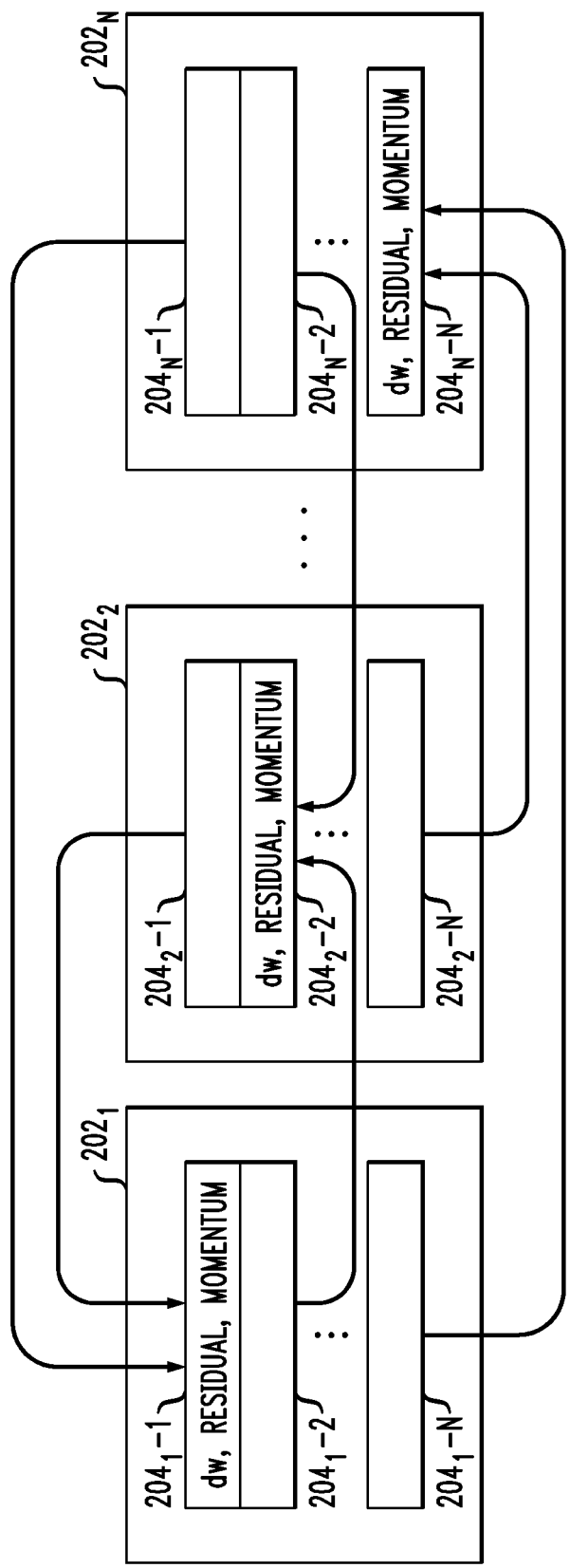
FIG. 2 depicts an example multiple learner system, according to an exemplary embodiment of the present invention.

Additional efficiencies may be achieved through the use of a multiple learner system. In a multiple learner system, each learner performs a portion or fraction of a weight update for a given iteration. For example, with reference to FIG. 2, in an illustrative embodiment, an example multiple learner system 200 is illustrated. Multiple learner system 200 comprises learners $202_1$, $202_2$, ... $202_N$. Each learner 202 in the multiple learner system 200 comprises at least a portion of learner circuitry 100. In some embodiments, one or more of learners 202 comprise a computing node 1310 the components of which are described in more detail below with reference to FIG. 13.

Each learner 202 comprises respective weight-update information entries $204_1$-1, $204_1$-2, ... $204_1$-N, $204_2$-1, $204_2$-2, ... $204_2$-N ... 204N-1, 204N-2, ... 204N-N each of which corresponds to a portion of the weight gradients, residuals and momentum for the neural network. Each weight-update information entry 204 corresponds to the portion of weight update information generated by one of the learners 202. For example, the weight-update information entry $204_1$-1 corresponds to the portion of weight update information generated by learner $202_1$, the weight-update information entry $204_2$-2 corresponds to the partial weight update information generated by learner $202_2$, ... and the weight-update information entry 204N-N corresponds to the portion of weight update information generated by learner $202_N$.

In some embodiments, a given learner 202 may generate weight update information for more than one portion of weight-update information entries 204. In some embodiments, the portion of the weight gradients, residuals and momentum corresponding to each entry may comprise a portion of the weight gradients, residuals and momentum of one or more layers and in some embodiments of each layer. For example, in some embodiments, a given learner 202 may handle calculating the weight update information associated with the same portion of the weight gradients, residuals and momentum found on each of the layers of the neural network.

In some embodiments, after back propagation, each learner 202 obtains or calculates a portion, dw, of the partial reduced weight gradient $W_{grad}$ and provides the portion, dw, to each other learner 202. The partial reduced weight gradient refers to a portion or chunk of a full reduced weight gradient that is calculated by each learner 202 during back propagation. For each learner 202, at least one portion dw of the partial reduced weight gradient $W_{grad}$ is summed up with the same portion of partial reduced $W_{grad}$ obtained from all other learners 202 to form the full-reduced weight gradient $W_{grad}$ for that portion dw, which is used to update the corresponding portion of the weight.

While the portion of the quantized weight $W_q$ and the portion dw of the weight gradient $W_{grad}$ that are generated or calculated by a given learner 202 using learner circuitry 100 are replicated to the other learners 202, in some embodiments, the portion of the quantized residual $Res_q$ and other parameters such as, e.g., momentum, that are utilized by the given learner 202 to update the corresponding portion of the weight is not replicated and instead is stored locally on the given learner 202. For example, since the portion of the quantized residual $Res_q$ is used within the learner circuitry 100 of the given learner 202 and is not needed by the other learners 202 for calculating the respective portions of their quantized weights $W_q$, there is no need to replicate the portion of the quantized residual $Res_q$ that is used by the given learner 202 to the other learners 202 which reduces the needed bandwidth.

Each given learner 202 uses at least a portion of learner circuitry 100 to calculate a portion of the quantized weight $W_q$ corresponding to a given layer of the neural network. The portion of the quantized weight $W_q$ is replicated to each other learner 202 and stored in the corresponding weight-update information entry 204 for that given layer. The portions of the quantized weight $W_q$ obtained from each of the learners 202 are combined, e.g., concatenated together, to form the quantized weight $W_q$ which is used in the next iteration for all learners.

Figure 3:
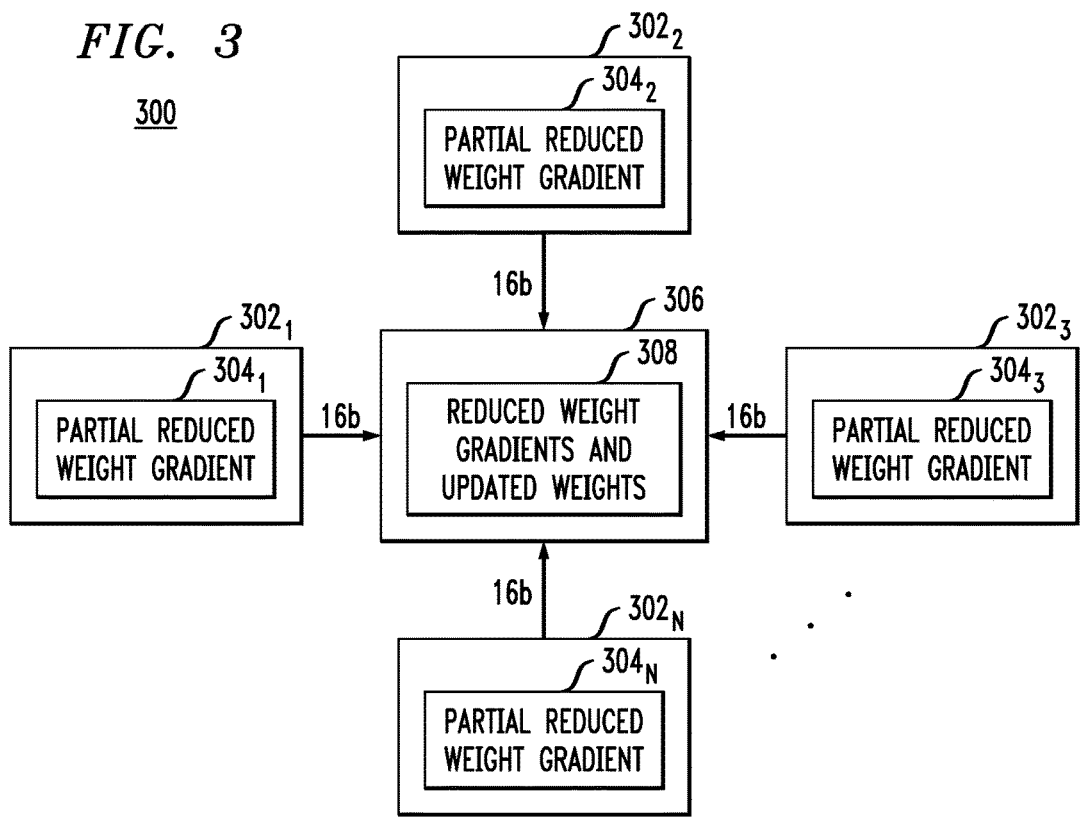
FIG. 3 depicts another example multiple learner system comprising a parameter server and illustrating the transfer of partial gradients form the learners to the parameter server, according to an exemplary embodiment of the present invention.
Figure 4:
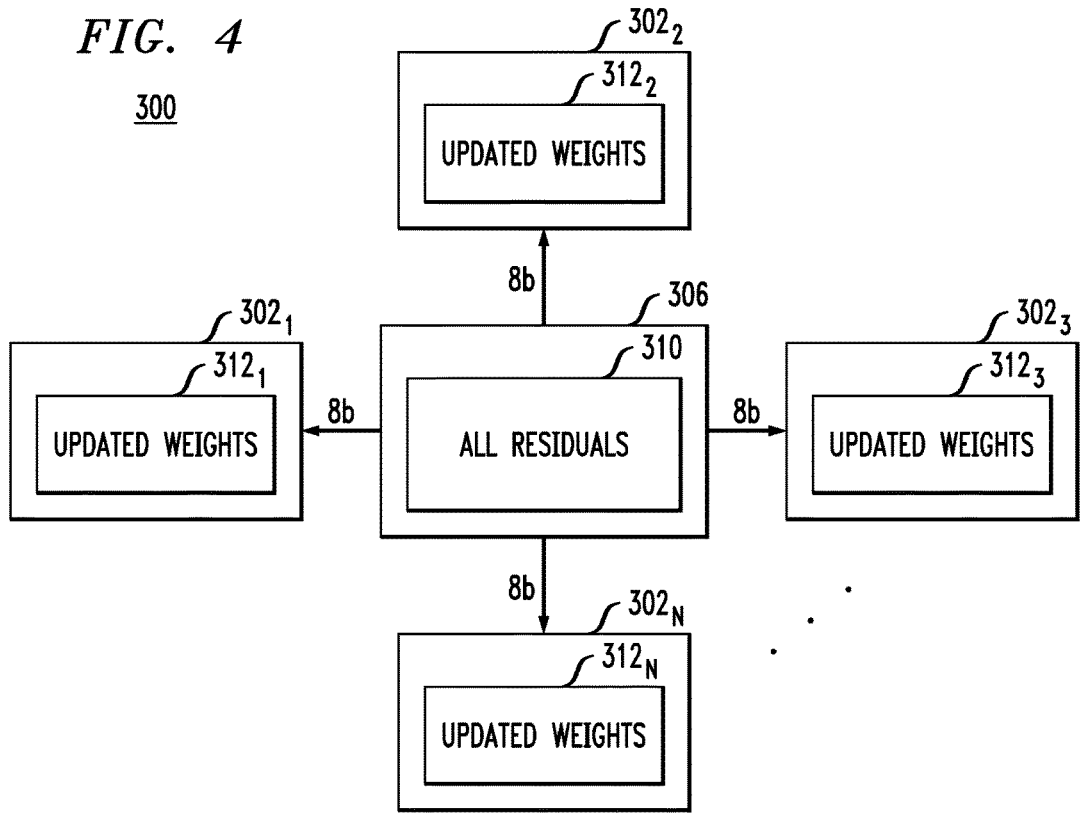
FIG. 4 depicts the example multiple learner system of FIG. 3 illustrating the transfer of weights from the parameter server to the learners, according to an exemplary embodiment of the present invention.

With reference now to FIGS. 3 and 4, in another example multiple learner system 300, a parameter server 306 is included in addition to the learners $302_1$, $302_2$, $302_3$ ... $302_N$. Multiple learner system 300 splits up the weight update flow described above between the multiple learners 302 and one or more parameter servers 306. For example, the learners 302 submit their respective partial reduced weight gradient $304_1$, $304_2$, $304_3$ ... $304_N$ to the parameter server 306, e.g., in FP16 format, and parameter server 306 combines, e.g., sums up, the partial reduced weight gradients 304 to form full reduced weight gradients and utilizes at least a portion of the learner circuitry 100 to generate quantized full reduced weight gradients and new quantized weights 308. As seen in FIG. 4, residuals 310 are calculated and stored locally by the parameter server 306 while the updated quantized weights $312_1$, $312_2$, $312_3$ ... $312_N$, which have an FP8 format in an example embodiment, are provided to the learners 302 for use in the next iteration.

As can be seen in FIGS. 3 and 4, breaking a precise weight having a high precision format, e.g., an FP32 format, into a lower precision format quantized weight, e.g., a FP8 format, and a lower precision format residual, e.g., FP16 format, in a multiple learner system 300 having a parameter server 306 reduces the required bandwidth usage between learners 302 and the parameter server 306. For example, instead of sending full 32-bit high precision weights or other parameters between the learners 302 and the parameter server 306, each learner 302 only needs to send 16-bit partial reduced weight gradients 304 to the parameter server. The parameter server 306 then performs the calculations according to at least some of the learner circuitry 100 and only needs to send the calculated 8-bit quantized weights to each of the learners 302. This significant reduction in the bandwidth increases the efficiency in the system.

Figure 5:
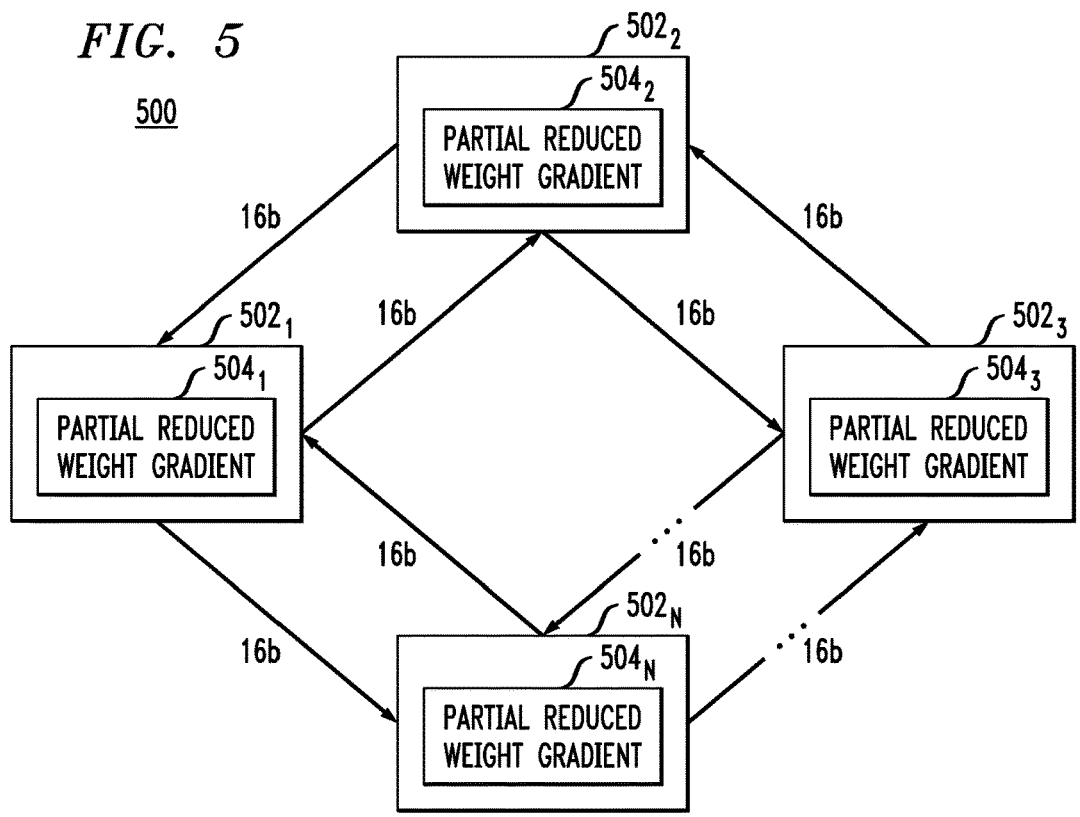
FIG. 5 depicts another example multiple learner system comprising a ring configuration and illustrating the transfer of partial gradients between the learners, according to an exemplary embodiment of the present invention.
Figure 6:
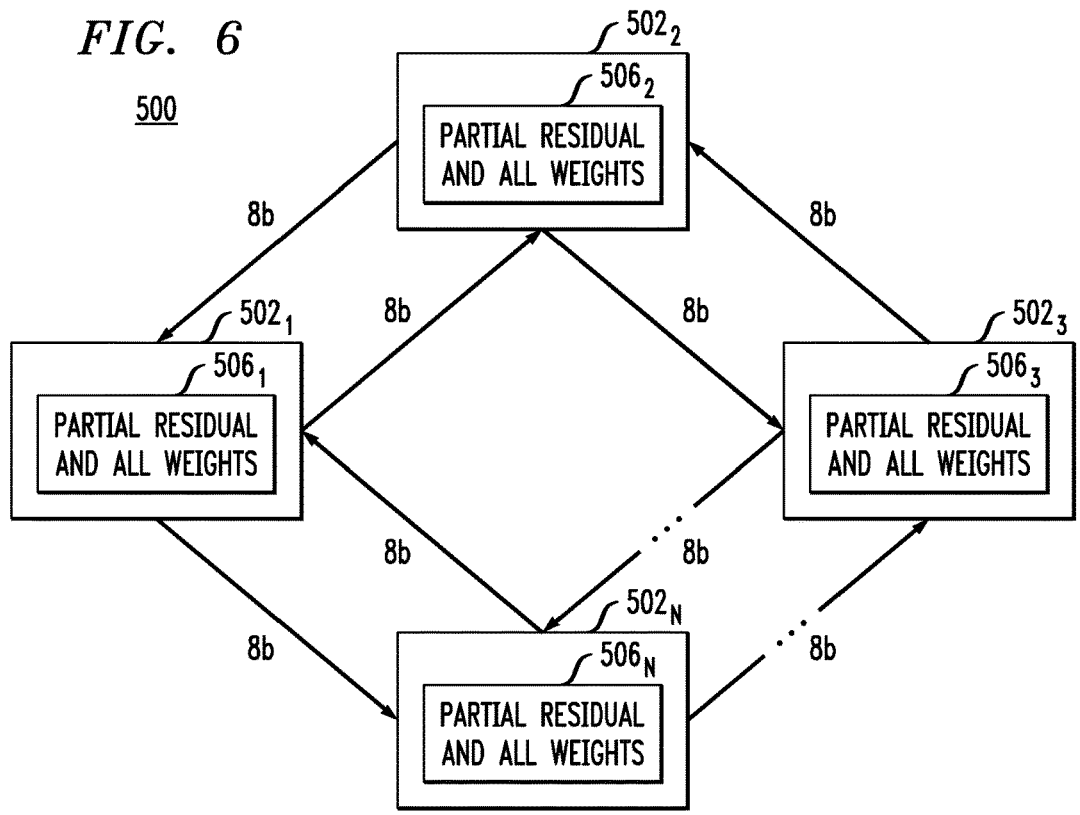
FIG. 6 depicts the example multiple learner system of FIG. 5 illustrating the transfer of portions of weights between the learners, according to an exemplary embodiment of the present invention.

With reference now to FIGS. 5 and 6, in another example multiple learner system 500, a ring-based configuration is utilized that does not include a parameter server. Multiple learner system 500 comprises learners $502_1$, $502_2$, $502_3$, ... $502_N$ where learner $502_1$ is configured to communicate with adjacent learners $502_N$ and $502_2$, learner $502_2$ is configured to communicate with learners $502_1$ and $502_3$, and so on in a ring.

Multiple learner system 500 splits up the weight update flow between the multiple learners 502 where each learner 502 separately performs calculations according to at least some of learner circuitry 100 to determine a respective partial reduced weight gradient $504_1$, $504_2$, $504_3$, . . . $504_N$. In some embodiments, the partial reduced weight gradients 504 have the FP16 format. The learners 502 provide partial reduced weight gradients 504 in portions to adjacent learners 502 to propagate the partial reduced weight gradients 504 around the ring. In some embodiments, at least one portion of the partial reduced weight gradients 504 is accumulated at each learner 502 until each learner has a portion of a fully reduced weight gradient. The learners 502 then update their own portion of the weights based at least in part on the same portion of the fully reduced weight gradients to generate a respective portion of updated weights and residuals $506_1$, $506_2$, $506_3$ . . . $506_N$ (FIG. 6). In some embodiments, for example, the updated weights are quantized weights in the FP8 format and the residuals are quantized residuals in the FP16 format. The quantized weights of each portion from each learner are then sent along the ring as described above until all learners 502 have the full set of updated weights while each learner 502 maintains its own portion of the residuals and does not share the portion of residuals with the other learners. In some embodiments, the residuals may alternatively be shared around the ring.

As can be seen in FIGS. 5 and 6, breaking a precise weight having a high precision format, e.g., an FP32 format, into a lower precision format quantized weight, e.g., a FP8 format, and a lower precision format residual, e.g., FP16 format, in a multiple learner system 500 having a ring configuration, bandwidth usage between learners 502 in the ring may be reduced. For example, instead of sending full 32-bit high precision weights or other parameters between each learner 502, 16-bits may be sent for replicating and accumulating the weight gradients and 8-bits may be sent for replicating the weights themselves. This significant reduction increases the efficiency in the system.

With reference now to FIGS. 7 through 12, an example weight update flow that may be utilized in the multiple learner system 500 will now be described.

Figure 7:
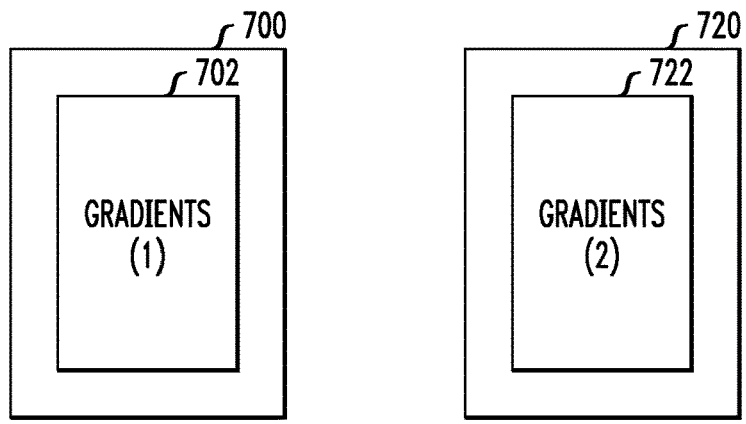
FIG. 7 depicts two example learners of a multiple learner system comprising buffers with gradients, according to an exemplary embodiment of the present invention.

FIG. 7 illustrates an example multiple learner system having two learners, first learner 700 and second learner 720. While FIGS. 7 through 12 illustrate a multiple learner system having two learners for ease of understanding it is understood that the example weight update flow illustrated in FIGS. 7 through 12 may be utilized with more than two learners.

As shown in FIG. 7, first learner 700 comprises a buffer 702 and second learner 720 comprises a buffer 722. Buffer 702 comprises gradients for the first learner 700 which are denoted by a (1) and buffer 722 comprises gradients for the second learner 720 which are denoted by a (2).

Figure 8:
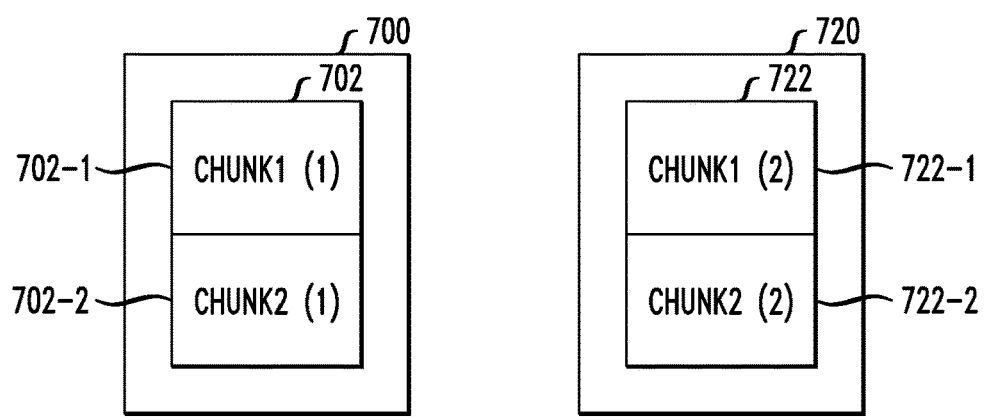
FIG. 8 depicts the two example learners of FIG. 7 illustrating their respective gradients divided into chunks, according to an exemplary embodiment of the present invention.

With reference now to FIG. 8, buffer 702 comprises a first portion 702-1 and a second portion 702-2 each of which stores a chunk of the gradients (1). For example, portion 702-1 stores a first chunk of the gradients (1), designated as chunk1 (1), while portion 702-2 stores a second chunk of the gradients (1), designated as chunk2 (1). Likewise, buffer 722 comprises portions 722-1 and 722-2 each of which stores a chunk of the gradients (2). For example, portion 722-1 stores a first chunk of the gradients (2), designated as chunk1 (2), while portion 722-2 stores a second chunk of the gradients (2), designated as chunk2 (2). In some embodiments, the number of portions that the buffer for each learner is broken into may be based on the total number of learners in the multiple learner system. For example, if there are six learners in the multiple learner system, each learner may comprise a buffer six portions, each of which comprises a given chunk of that learner's gradients. A given learner in the multiple learner system may be associated with a given portion of the buffers of all of the learners. For example, in some embodiments, the first portion of each buffer may be associated with first learner 700, the second portion of each buffer may be associated with second learner 720, and so on for each learner in the multiple learner system.

Figure 9:
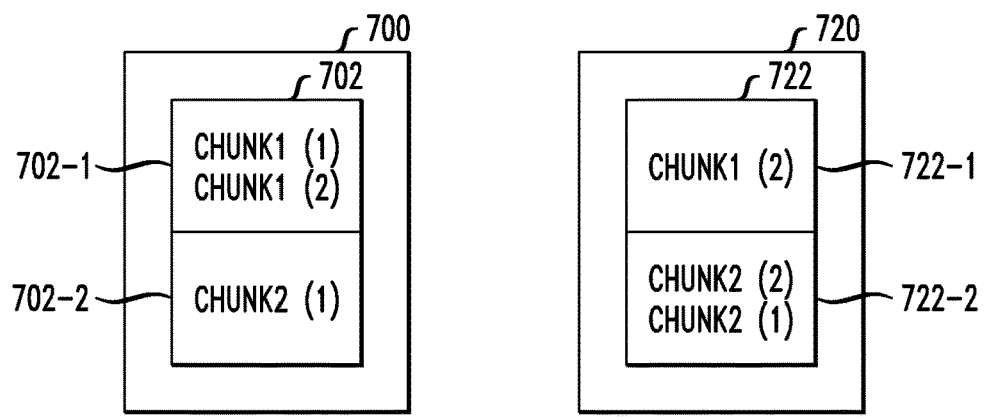
FIG. 9 depicts the two example learners of FIG. 8 illustrating respective chunks being transferred between the two example learners, according to an exemplary embodiment of the present invention.

With reference now to FIG. 9, in the example embodiment, first learner 700 is associated with the first portions 702-1 and 722-1 while second learner 720 is associated with the second portions 702-2 and 722-2. As shown in FIG. 9, chunk1 (2) of portion 722-1 is replicated to portion 702-1 of first learner 700 and chunk2 (1) of portion 702-2 is replicated to portion 722-2 of second learner 720. As mentioned above, where additional learners are present, the chunk1 of each of those additional learners will be replicated to portion 702-1, the chunk2 of each of those additional learners will be replicated to portion 722-2, and any additional chunks will be replicated to the associated learner for the portion storing that chunk. In some embodiments, for example, where a ring configuration is utilized, the replication of each chunk may occur via one or more intermediary learners.

Figure 10:
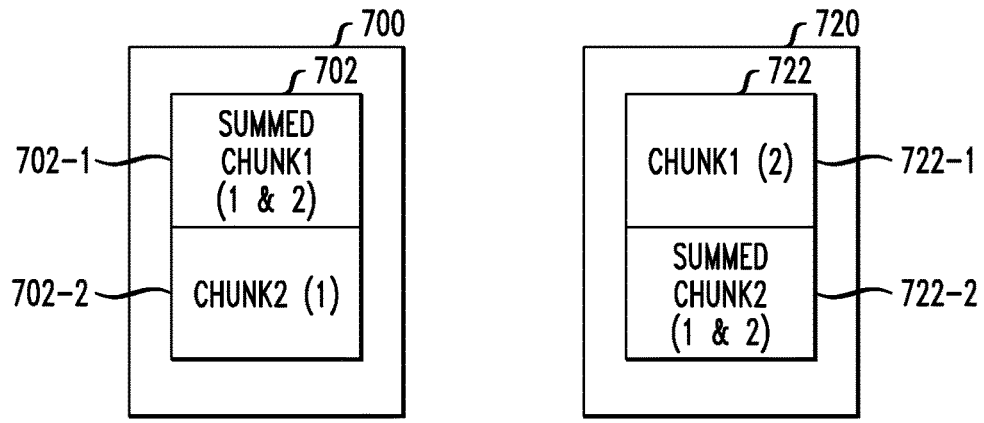
FIG. 10 depicts the two example learners of FIG. 9, illustrating the transferred chunks being summed with the corresponding existing chunks, according to an exemplary embodiment of the present invention.

With reference now to FIG. 10, each learner sums the replicated chunks for its associated portion together. For example, first learner 700 sums chunk1 (1) and chunk1 (2) of portion 702-1 together to form a summed chunk1 (1 & 2). Likewise, second learner 720 sums chunk2 (1) and chunk2 (2) of portion 722-2 together to form a summed chunk2 (1 & 2). In some embodiments, the size of the summed chunk1 (1 & 2) may be reduced in size to the original size of the single chunk1 (1), for example, using a reduce-scatter phase. Note that in the example embodiment, each learner only sums the chunks found in its associated portion, not in all portions of its buffer. This reduces the required calculations at each learner since each learner is performing calculations for a different portion of the gradients which improves efficiency in the system.

Figure 11:
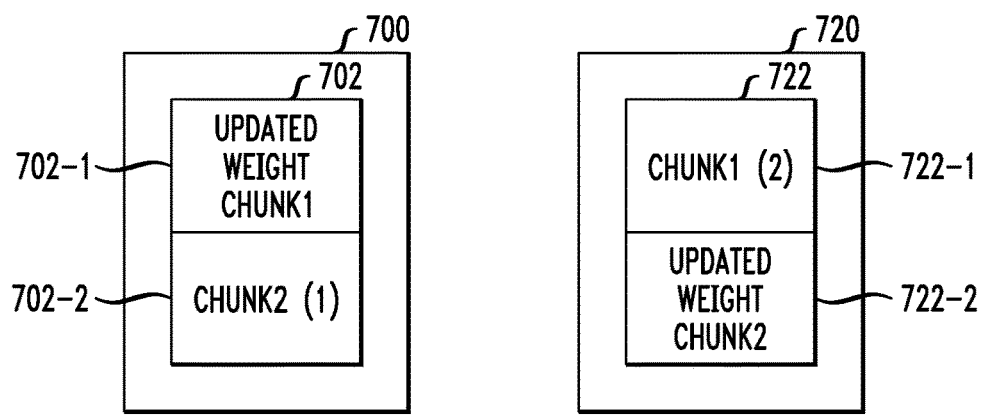
FIG. 11 depicts the two example learners of FIG. 10, illustrating corresponding weights generated based on the summed chunks, according to an exemplary embodiment of the present invention.

With reference now to FIG. 11, each learner updates the weight for the chunk stored in the portion associated with that learner. For example, first learner 700 updates the weight for chunk1 stored in portion 702-1 of buffer 702 based at least in part on the summed chunk1 (1 & 2). Similarly, second learner 720 updates the weight for chunk2 stored in portion 722-2 of buffer 722 based at least in part on the summed chunk2 (1 & 2). In illustrative embodiments, the weight may be updated according to learner circuitry 100 as described in any of the above embodiments.

Note that in the example embodiment, each learner only updates the weight for the chunks found in its associated portion, not in all portions of its buffer. This reduces the required calculations at each learner since each learner is performing calculations for a different portion of the gradients which improves efficiency in the system. This significantly reduces local memory stress for on-chip memory and also provides a significant reduction in bandwidth, e.g., 30%, when off-chip memory is utilized. In illustrative embodiments, the weight may also be quantized, for example, to the FP8 format as described above.

Figure 12:
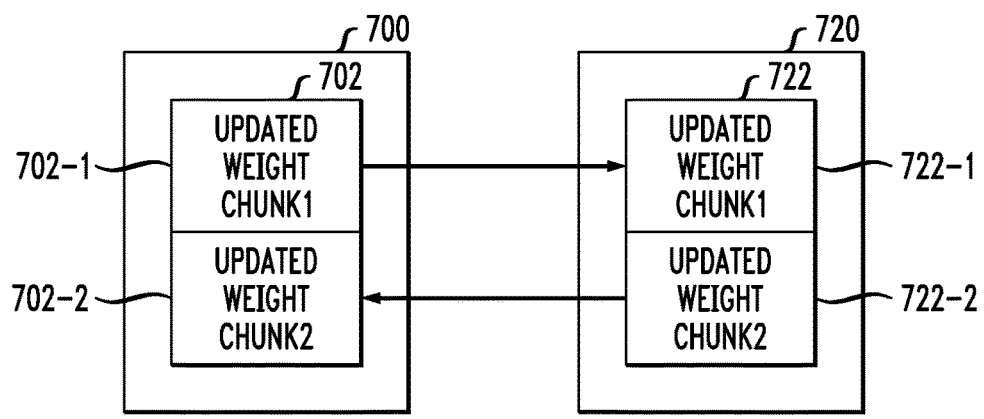
FIG. 12 depicts the two example learners of FIG. 11, illustrating a transfer of the corresponding weights between the example learners, according to an exemplary embodiment of the present invention.

With reference now to FIG. 12, each learner replicates the updated weight for the chunk stored in the portion associated with that learner to the other learners in the multiple learner system. For example, first learner 700 provides the updated weight for chunk1 stored in portion 702-1 of its buffer 702 to second learner 720 which overwrites the corresponding weight for chunk1 that is stored in its portion 722-1 of its buffer 722. Likewise, second learner 720 provides the updated weight for chunk2 stored in portion 722-2 of its buffer 722 to first learner 700 which overwrites the corresponding weight for chunk2 that is stored in its portion 702-2 of its buffer 702. Other learners may similarly be provided with the updated weight for each portion. Note that in the example embodiment, each learner only provides the weights for its associated portion to the other learners, not in all of the weights of its buffer. This reduces the required calculations at each learner since each learner is performing calculations for a different portion of the weight which improves efficiency in the system. In addition, where the weight is quantized to a lower precision format such as, e.g., an FP8 format, additional efficiencies in bandwidth usage may be achieved since each learner is only providing one weight for replication to the other learners.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
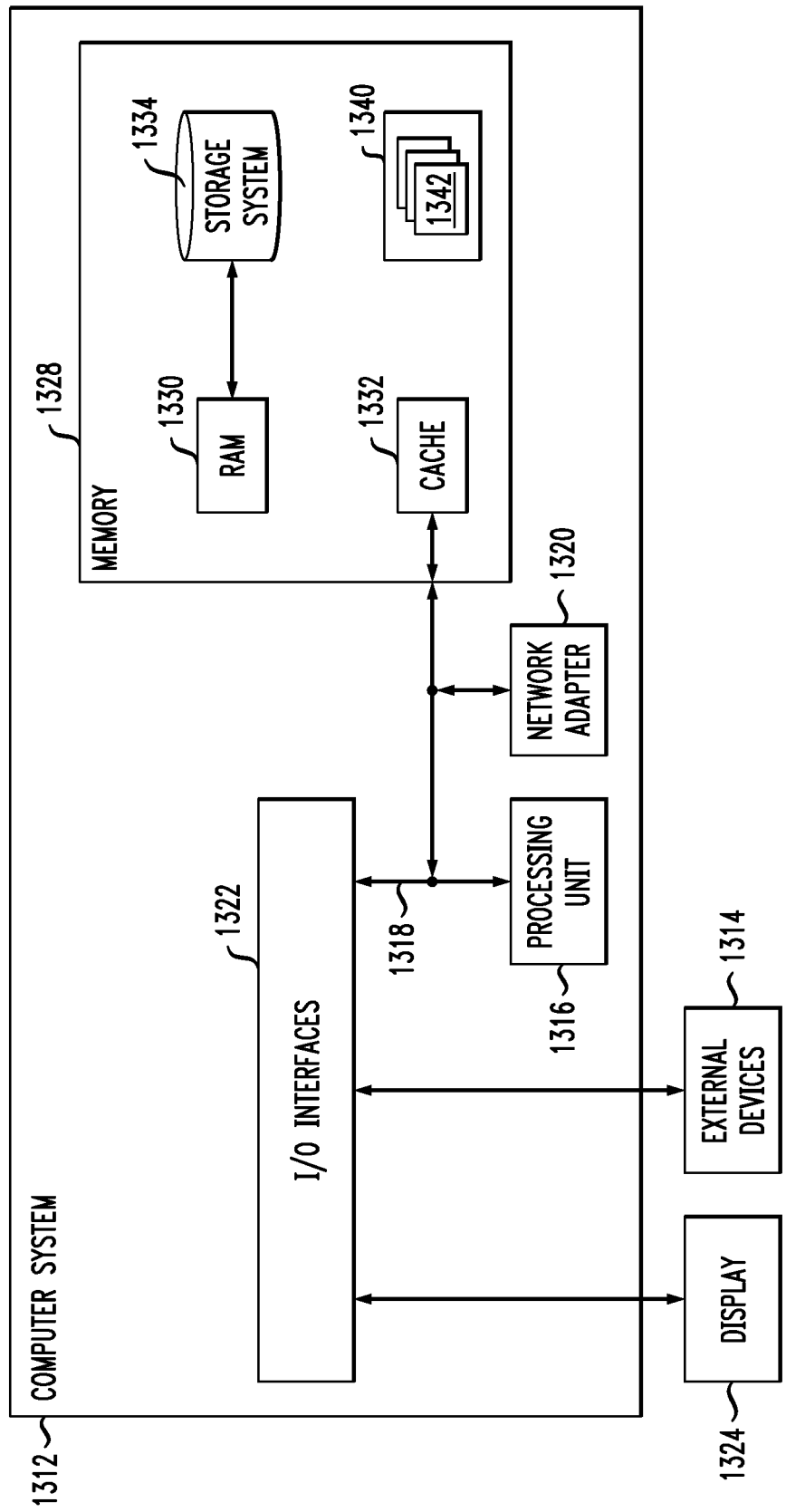
FIG. 13 depicts a computer system in accordance with which one or more components/steps of techniques of the invention may be implemented, according to an exemplary embodiment of the invention.

One or more embodiments can make use of software running on a general-purpose computer or workstation. With reference to FIG. 13, in a computing node 1310 there is a computer system/server 1312, which is operational with numerous other general purpose or special purpose computing system environments or configurations. Examples of well-known computing systems, environments, and/or configurations that may be suitable for use with computer system/server 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 1312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 1312 in computing node 1310 is shown in the form of a general-purpose computing device. The components of computer system/server 1312 may include, but are not limited to, one or more processors or processing units 1316, a system memory 1328, and a bus 1318 that couples various system components including system memory 1328 to processing unit 1316. In an illustrative embodiment, processing unit 1316 comprises the learner circuitry 100. In other embodiments, processing unit 1316 may be separate from the learner circuitry 100 and configured to communicate with the learner circuitry 100 via bus 1318 or a network adapter 1320.

The bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1312 typically includes a variety of computer system readable media. Such media may be any available media that is accessible by computer system/server 1312, and it includes both volatile and non-volatile media, removable and non-removable media.

The system memory 1328 can include computer system readable media in the form of volatile memory, such as random access memory (RAM) 1330 and/or cache memory 1332. The computer system/server 1312 may further include other removable/non-removable, volatile/nonvolatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1318 by one or more data media interfaces. As depicted and described herein, the system memory 1328 may include at least one program product having a set (e.g., at least one) of program modules that are configured to carry out the functions of embodiments of the invention. A program/utility 1340, having a set (at least one) of program modules 1342, may be stored in system memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the invention as described herein.

Computer system/server 1312 may also communicate with one or more external devices 1314 such as a keyboard, a pointing device, a display 1324, etc., one or more devices that enable a user to interact with computer system/server 1312, and/or any devices (e.g., network card, modem, etc.) that enable computer system/server 1312 to communicate with one or more other computing devices. Such communication can occur via I/O interfaces 1322. Still yet, computer system/server 1312 can communicate with one or more networks such as a LAN, a general WAN, and/or a public network (e.g., the Internet) via network adapter 1320. As depicted, network adapter 1320 communicates with the other components of computer system/server 1312 via bus 1318. It should be understood that although not shown, other hardware and/or software components could be used in conjunction with computer system/server 1312. Examples include, but are not limited to, microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
  circuitry which is configured to perform a neural network training process for training a neural network comprising weights, wherein the neural network training process comprises an iterative weight update process that is configured to update the weights of the neural network for each iteration of the neural network training process, wherein the weights are represented as floating point numbers, wherein in performing the iterative weight update process, the circuitry is configured:

to generate, in a current iteration of the weight update process, a first weight having a first floating point format comprising a first number of bits, wherein the first weight is generated based at least in part on a weight gradient, a second weight determined from a prior iteration of the weight update process, and a residual from the prior iteration of the weight update process, the second weight having a second floating point format comprising a second number of bits, and the residual having a third floating point format comprising a third number of bits, the second number of bits and the third number of bits each being less than the first number of bits;

to update, in the current iteration of the weight update process, the second weight based at least in part on the first weight;

to update, in the current iteration of the weight update process, the residual based at least in part on the updated second weight and the first weight;

to store, in the current iteration of the weight update process, the updated second weight and the updated residual in memory, wherein the updated second weight and the updated residual represent the first weight generated in the current iteration of the weight update process, and wherein an amount of memory for storing the updated second weight and the updated residual is less than an amount of memory that would be needed to store the first weight, thereby utilizing less storage space of the memory to store the updated second weight and the updated residual which represent the first weight for the current iteration, and enabling a decrease in read access latency for accessing the updated second weight and the updated residual for processing in a next iteration of the weight update process as compared to a read access latency associated with accessing the first weight from the memory;

to read from the memory, in the next iteration of the weight update process, the updated second weight and the updated residual which are representative of the first weight stored in the memory in the previous iteration; and to update, in the next iteration of the weight update process, the first weight based at least in part on the updated second weight and the updated residual read from the memory.

2. The apparatus of claim 1, wherein the second number of bits comprises 8 bits.

3. The apparatus of claim 1, wherein the third number of bits comprises 16 bits.

4. The apparatus of claim 1, wherein the second number of bits and the third number of bits, together, comprise fewer bits than the first number of bits.

5. The apparatus of claim 4, wherein in updating the residual based at least in part on the updated second weight and the first weight, the circuitry is configured:

to generate, in the current iteration, a second residual comprising a fourth number of bits based at least in part on the updated second weight and the first weight, the fourth number of bits having a greater number of bits than the third number of bits; and to quantize, in the current iteration, the second residual from the fourth number of bits to the third number of bits to update the residual.

6. The apparatus of claim 5, wherein the circuitry is further configured:

to scale up, in the current iteration, the second residual based at least in part on a scaling factor prior to quantizing the second residual; and to scale down, in the current iteration, the updated residual based at least in part on the scaling factor prior to updating the first weight based at least in part on the updated second weight and the updated residual.

7. A method, comprising:

performing, by processing circuitry, a neural network training process for training a neural network comprising weights, wherein the neural network training process comprises an iterative weight update process to update weights of the neural network for each iteration of the neural network training process, wherein the weights are represented as floating point numbers, wherein the iterative weight update process comprises:

generating, in a current iteration of the weight update process, a first weight having a first floating point format comprising a first number of bits, wherein the first weight is generated based at least in part on a weight gradient, a second weight determined from a prior iteration of the weight update process, and a residual from the prior iteration of the weight update process, the second weight having a second floating point format comprising a second number of bits, and the residual having a third floating point format comprising a third number of bits, the second number of bits and the third number of bits each being less than the first number of bits;

updating, in the current iteration of the weight update process, the second weight based at least in part on the first weight;

updating, in the current iteration of the weight update process, the residual based at least in part on the updated second weight and the first weight;

storing, in the current iteration of the weight update process, the updated second weight and the updated residual in memory, wherein the updated second weight and the updated residual represent the first weight generated in the current iteration of the weight update process, and wherein an amount of memory for storing the updated second weight and the updated residual is less than an amount of memory that would be needed to store the first weight, thereby utilizing less storage space of the memory to store the updated second weight and the updated residual which represent the first weight for the current iteration, and enabling a decrease in read access latency for accessing the updated second weight and the updated residual for processing in a next iteration of the weight update process as compared to a read access latency associated with accessing the first weight from the memory;

reading from the memory, in the next iteration of the weight update process, the updated second weight and the updated residual which are representative of the first weight stored in the memory in the previous iteration; and updating, in the next iteration of the weight update process, the first weight based at least in part on the updated second weight and the updated residual read from the memory.

8. The method of claim 7, wherein the second number of bits comprises 8 bits.

9. The method of claim 7, wherein the third number of bits comprises 16 bits.

10. The method of claim 7, wherein the second number of bits and the third number of bits, together, comprise fewer bits than the first number of bits.

11. The method of claim 10, wherein updating the residual based at least in part on the updated second weight and the first weight comprises:
generating, in the current iteration, a second residual comprising a fourth number of bits based at least in part on the updated second weight and the first weight, the fourth number of bits having a greater number of bits than the third number of bits; and
quantizing, in the current iteration, the second residual from the fourth number of bits to the third number of bits to update the residual.

12. The method of claim 11, the method further comprising:
scaling up, in the current iteration, the second residual based at least in part on a scaling factor prior to quantizing the second residual; and
scaling down, in the current iteration, the updated residual based at least in part on the scaling factor prior to updating the first weight based at least in part on the updated second weight and the updated residual.

13. An apparatus comprising processing circuitry that implements at least one learner node of a multiple learner node system which comprises multiple learner nodes and a parameter server, which are connected over a network and configured to communicate over the network to perform a distributed neural network training process for training a neural network comprising weights, wherein the distributed neural network training process comprises an iterative weight update process to update weights of the neural network for each iteration of the distributed neural network training process, the at least one learner node comprising processing circuitry which:
generates a portion of a gradient;
transmits the portion of the gradient over the network to at least one other component of the multiple learner node system, wherein the at least one other component comprises one of another learner node and the parameter server;
receives a portion of a weight transmitted over the network from the at least one other component of the multiple learner node system, wherein the received portion of the weight comprises a first floating point format comprising a first number of bits which is less than a second number of bits of a second floating point format of the weights of the neural network; and
updates a weight based at least in part on the received portion of the weight transmitted from the at least one other component of the multiple learner node system over the network, wherein the updated weight comprises the second floating point format comprising the second number of bits which is greater than the first number of bits;
wherein the transmitting the portion of a weight over the network from the at least one other component, which has the first floating point format comprising the first number of bits, enables a reduction in network bandwidth usage for the at least one learner node to receive the portion of a weight transmitted from the at least one other component over the network for use by the processing circuitry of the at least one learner node to update the weight based on the portion of the weight, as compared to a network bandwidth usage associated with transmitting a weight with the second floating point format over the network.

14. The apparatus of claim 13, wherein;
the at least one other component of the multiple learner node system comprises the parameter server;
in transmitting the portion of the gradient to the at least one other component of the multiple learner node system, the processing circuitry transmits the portion of the gradient to the parameter server, and the parameter server generates the weight based at least in part on the portion of the gradient.

15. The apparatus of claim 14, wherein the parameter server:
generates a residual based at least in part on the weight; and
maintains the residual locally on the parameter server without providing the residual to the at least one learner node.

16. The apparatus of claim 13, wherein;
the multiple learner node system comprises a plurality of learner nodes configured in a ring format;
in transmitting the portion of the gradient to the at least one other component of the multiple learner node system, the processing circuitry transmits the portion of the gradient to at least one other learner node of the plurality of learner nodes;
the processing circuitry of the at least one learner node:
receives a second portion of the gradient from the at least one other learner node;
generates a second portion of the weight based at least in part on the portion of the gradient and the second portion of the gradient; and
provides the second portion of the weight to the at least one other learner node.

17. The apparatus of claim 16, wherein the portion of the weight received from the at least one other component of the multiple learner node system over the network comprises a third portion of the weight generated by at least a third learner node of the multiple learner node system.

18. The apparatus of claim 17, wherein in updating the portion of the gradient based at least in part on the portion of the weight received from the at least one other component over the network, the processing circuitry updates the portion of the gradient based at least in part on the second portion of the weight generated by the at least one learner node and the third portion of the weight generated by at least the third learner node of the multiple learner node system.

19. The apparatus of claim 16, wherein the processing circuitry of the at least one learner node:
generates a residual based at least in part on the second portion of the weight;
updates the second portion of the weight based at least in part on the residual; and
stores the residual locally on the at least one learner node, wherein the residual is not provided to another learner node of the plurality of learner nodes.

20. The apparatus of claim 13, wherein the portion of the gradient comprises a 16-bit floating point format and the portion of the weight comprises an 8-bit floating point format.

* * * * *